July 10, 1951
W. THOMAS
2,560,261
AUTOMATIC TOASTER MECHANISM
Filed Sept. 26, 1946
4 Sheets-Sheet 1
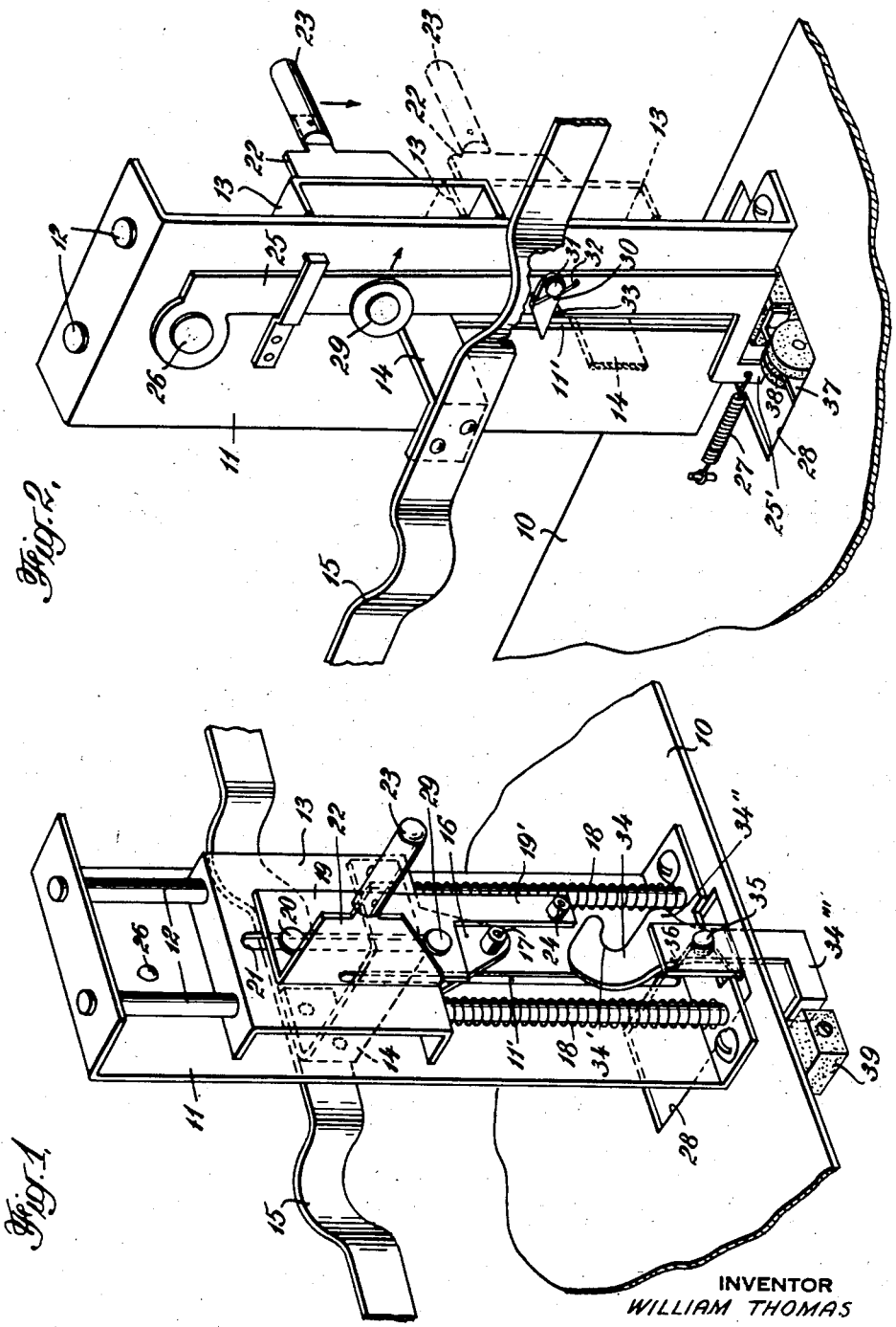
INVENTOR
WILLIAM THOMAS
BY
ATTORNEYS July 10, 1951  W. THOMAS  2,560,261
AUTOMATIC TOASTER MECHANISM
Filed Sept. 26, 1946  4 Sheets-Sheet 2
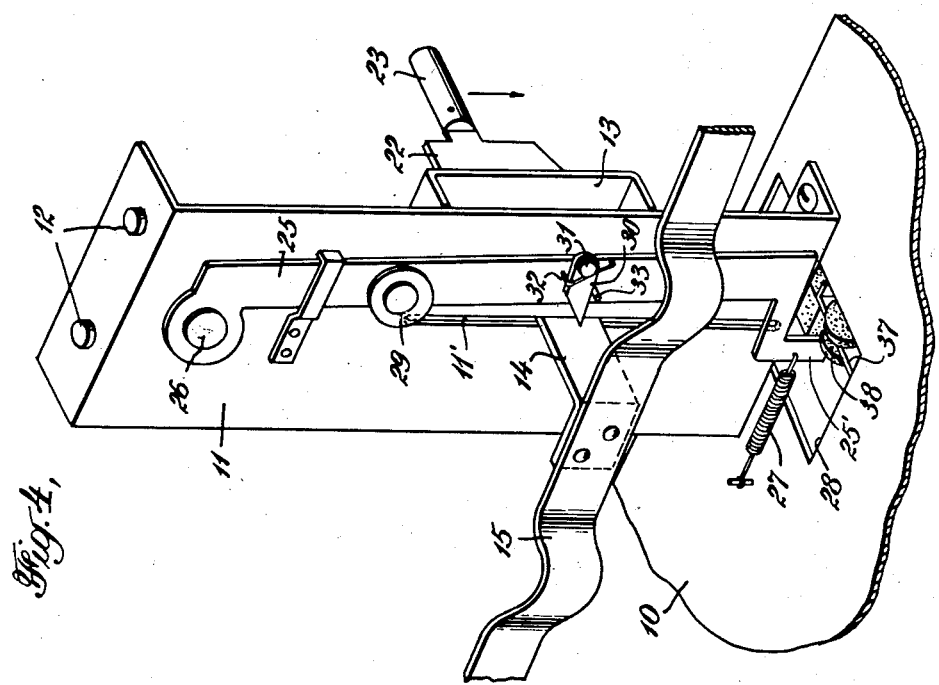
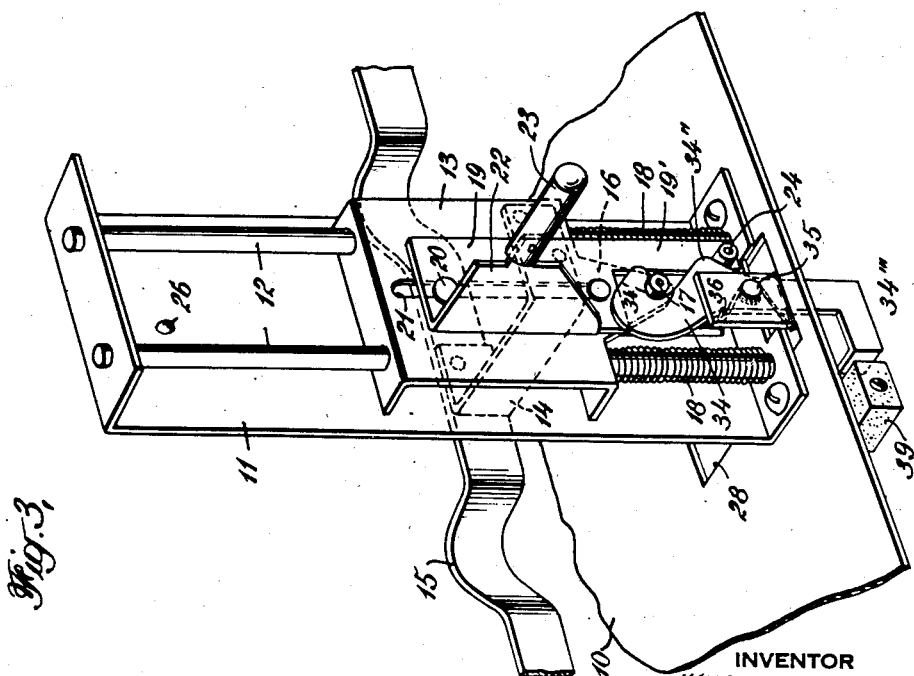
INVENTOR
WILLIAM THOMAS
BY
ATTORNEYS

INVENTOR
WILLIAM THOMAS
BY
ATTORNEYS

July 10, 1951  W. THOMAS  2,560,261
AUTOMATIC TOASTER MECHANISM
Filed Sept. 26, 1946  4 Sheets-Sheet 4

INVENTOR
WILLIAM THOMAS
BY
Pennie, Edmonds, Morton & Barrows
ATTORNEYS

Patented July 10, 1951

2,560,261

UNITED STATES PATENT OFFICE 2,560,261

AUTOMATIC TOASTER MECHANISM

William Thomas, Rochester, N. Y., assignor to Samson United Corporation, Rochester, N. Y., a corporation of Delaware Application September 26, 1946, Serial No. 699,570

8 Claims. (Cl. 99—329)

1

This invention relates to an automatic toaster mechanism, and particularly to an improved bread lift and trip assembly operated automatically by a two-cycle, thermal timer mechanism.

The purpose of this invention is to provide a bread lift mechanism which will receive a slice of bread to be toasted in a raised position, hold same in toasting position by means of a latch when depressed until the latch is automatically tripped after an appropriate toasting time without the use of expensive clockwork, but which may be also conveniently released by hand at any time before the automatic trip operates.

It is a further purpose of this invention to provide an improved thermal timing device for tripping the latch of the bread lifter mechanism which will be adjustable over a reasonable range of desired toasting times and which will automatically compensate for the ambient heat in responding to any given position of the toasting time selector.

For a complete description of the mechanism of my invention, reference is made to the accompanying drawings, in which:

Fig. 1 is a front perspective view from above of the mechanism of my invention with the bread lift in its raised position;

Fig. 2 is a rear perspective view from above with the bread lift in the raised position, but showing the toasting position in dotted lines;

Fig. 3 is a view similar to Fig. 1, showing the bread lift latched down in toasting position;

Fig. 4 is a view similar to Fig. 2, showing the bread lift in a position intermediate that of Fig. 1 and Fig. 3;

Figure 5:
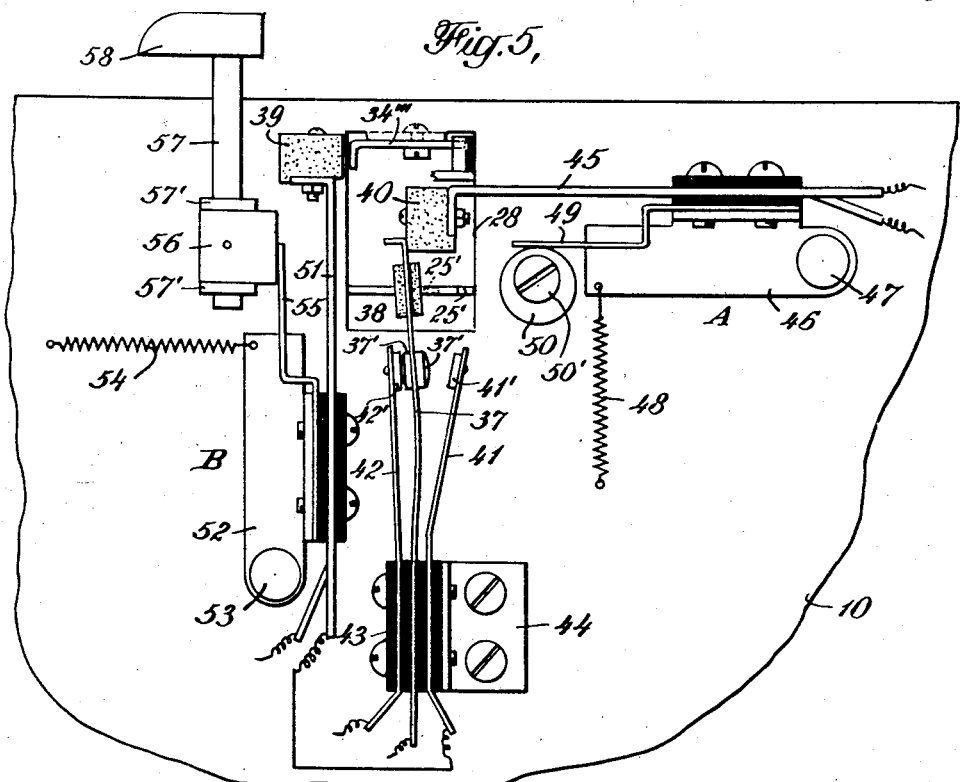
Fig. 5 is a plan view of the underside of the mechanism showing the thermal timer in the position it assumes immediately after the bread lift is latched down.

Referring now to the drawings (Figs. 1 and 2), a support bracket 11 is affixed to the upper side of a toaster base plate 10. Two guide rods 12 are mounted vertically on the front side of bracket 11. Slidably mounted on rods 12 is a carrier plate 13. A support arm 14 fixed to carrier plate 13 extends through a slot 11' in support bracket 11 to the back side thereof. At the back extremity of support arm 14 is mounted bread lifter

2

15 parallel to the base 10. A downward protruding extension 16 of carrier plate 13 has mounted on the front thereof pin and roller 17. Carrier plate 13 is biased in its upper, or non-toasting, position on rods 12 by springs 18 around those rods.

A handle plate 19 is slidably mounted on the front side of carrier plate 13 by means of the two-headed studs 20, which engage slot 21 of the carrier plate. A second pin and roller 24 is carried by a downward protruding extension 19' of handle plate 19. A second handle plate extension 22 extends to the front with handle 23 mounted on the front extremity thereof. It will be readily understood by those skilled in the art that handle plate extension 22 is provided to carry handle 23 to the outside of any desired ornamental casing (not shown) with which the entire toaster assembly may be provided.

A set bar 25 is pivoted by pin 26 on the back of support bracket 11. A spring 27, affixed to base plate 10, is attached the offset lower end 25' of set bar 25 which protrudes beneath base plate 10 through an opening 28 therein that extends front and back of support bracket 11. The edge of opening 28 acts as a stop against offset end 25' limiting the pivoting of set bar 25 about pin 26 by spring 27. When so stopped, the body portion of set bar 25 lies close and approximately parallel to slot 11' in bracket 11. Offset end 25' is arranged to engage insulator pad 38 of the thermal timer.

Set bar 25 carries a roller 29 between pin 26 and lower extremity 25' at a position to be engaged by support arm 14 when carrier plate 13 is in its non-toasting position. The effect of this engagement is to cam set bar 25 against spring 27 to the position shown in Fig. 2. Lower down on set bar 25, detent 30 is pivotally mounted on it by pin 31, biased into a horizontal position against stop 33 by spring 32. The operating face of detent 30 is so shaped and stop 33 so placed that support arm 14 moving past on the down stroke forces set bar 25 to rotate about its pivot 26 against the action of spring 27, while upward motion of support bar 14 past detent 30 merely rotates that detent about its pivot 31 against the action of spring 32 without affecting the position of the set bar (see Fig. 4).

Latch 34 is pivotally mounted about pin 35 on base 10. The upper end of latch 34 includes hook portion 34' and cam portion 34". The lower end of latch 34 extending through opening 28 includes the offset trigger portion 34'''.

Hook portion 34' is arranged to engage pin and roller 17 when bread lift 15 has been depressed to toasting position by downward pressure on handle 23. Cam portion 34" is arranged to cam latch 34 about pin 35 when engaged by pin and roller 24 on extension 19' of handle plate 19. Trigger portion 34''' is arranged to be engaged by insulator block 39 on the thermal timer. Latch 34 is biased about pin 35 by spring 36 against a stop (not shown) in a direction to engage hook portion 34' and to oppose the camming of cam portion 34" and the tripping of trigger portion 34'''. When latch 34 has been cammed to the fullest extent by pin and roller 24 acting on cam portion 34", hook portion 34' can no longer effectively engage pin and roller 17.

Before proceeding to a description of the thermal timer which operates to trip latch 34, let us follow the sequence of movements of the mechanism just described through a complete toasting cycle.

Referring particularly now to Fig. 1, it will be seen that when the mechanism is in starting position, springs 18 have raised bread lift 15 to the upper or non-toasting position and latch 34 is free of all contact with pins and rollers 17 and 24. Referring now to Fig. 2, it will be seen that support arm 14, in the non-toasting position, is in contact with roller 29 carried by set bar 25 and that this set bar is thus in an intermediate position between the extreme positions to which it may move under the influence of spring 27 on the one hand and detent 30 on the other.

Let us assume that handle 23 is now depressed to the position shown in Fig. 4. Detent 30 is brought into passing contact with support arm 14 and set bar 25 is thus carried to its extreme position against the influence of spring 27. Offset lower end 25' carries insulator pad 38 with it in this movement.

Let us now assume that handle 23 is depressed to the extreme position shown in Fig. 3 and in dotted lines in Fig. 2. Set bar 25 will be carried back by spring 27 until lower extremity 25' is stopped by contact with opening 28. This return motion will not affect insulator pad 38. Springs 18 are compressed. Pin and roller 24 has passed entirely by cam surface 34" of latch 34, having in thus passing incidentally "cocked" latch 34 to facilitate its latching operation, and hook portion 34' is now latched to pin and roller 17.

It will be especially observed that pressure on the trigger portion 34''' of latch 34 will cause hook portion 34' to release pin and roller 17, thus permitting carrier plate 13 and all the parts associated with it to return to the upper position under the influence of springs 18. It will be further observed that, because of the slidable mounting of handle plate 19 on carrier plate 13, an upward pull on handle 23 will, by the camming action of pin and roller 24 on cam portion 34", cause the hook portion 34' of latch 34 to release pin and roller 17. This provides a ready means of returning bread lift 15 to its non-toasting position prior to the expiration of the automatic cycle when necessary.

Turning now to the two-cycle thermal timer (Figs. 5–7), it will be seen that this mechanism comprises a spring contact blade 37 having contact points 37' on each side and beyond them insulator pads 38 mounted near one end, arranged to contact the offset lower extremity 25' of set bar 25. Double contact blade 37 is mounted on the underside of base plate 10 between spring contact blades 41 and 42 on bracket 44. The contact blades 41 and 42 carry single contact points 41' and 42' respectively, each arranged to be engaged by one of the contact points 37'. The inner ends of the three contact blades 41, 42 and 37 are insulated from one another and from the base plate by means of insulation 43. When subject only to the force of their own spring biases the three contact blades 41, 42 and 37 will assume the relative position illustrated in Fig. 6 with contact point 41' engaging one contact point 37'.

The extreme outward end of contact blade 37 is arranged to engage an insulator block 40 which is affixed to the outer end of a bimetal arm 45. The bimetal arm 45 is fastened to, but electrically insulated from, pivot bracket 46. Bracket 46 is pivotally mounted by pin 47 on the underside of base plate 10 and carries a bimetal stop member 49 which engages assembly adjustment eccentric stop 50 under the influence of spring 48. Insulator block 40, bimetal arm 45, pivot bracket 46, bimetal stop member 49, eccentric stop 50 and spring 48 comprise a "start" bimetal assembly A.

A second and substantially similar "trip" bimetal assembly, B, includes the insulator block 39 which is arranged to engage trigger portion 34''' of latch 34. Block 39 is mounted on the outward end of a bimetal arm 51, which, in turn, is mounted on, but electrically-insulated from, pivot bracket 52. Bracket 52 is pivotally mounted by pin 53 on the underside of base plate 10 and carries a bimetal stop member 55 which engages selector eccentric stop 56 under the influence of spring 54. Selector eccentric 56 is affixed to shaft 57 which is rotatably mounted on base 10 in bearing block 57'. A selector handle 58 is affixed to the outer end of shaft 57.

Figure 8:
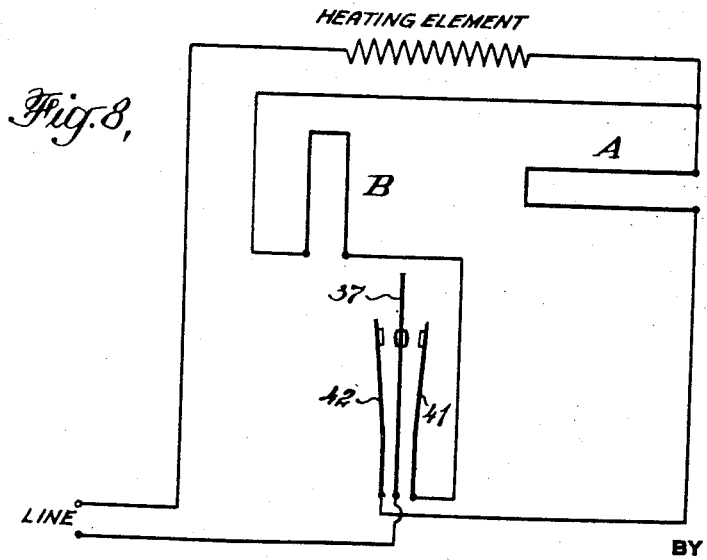
Fig. 8 is a circuit diagram of a toaster constructed according to my invention.

Referring now to Fig. 8, the electrical circuit of a toaster embodying my invention is shown. It will be observed that line current is supplied to the heating element in series through double contact blade 37 and alternately, either through single contact blade 42 and "start" bimetal assembly A or through single contact blade 41 and "trip" bimetal assembly B.

As we have already seen, when bread lift 15 is in the upper, or non-toasting, position shown in Fig. 1, the lower extremity 25' of set arm 25 is held in an intermediate position by interaction of support arm 14 and roller 29. This is the tripped position shown in Fig. 7. In this position, contacts 37' are held out of contact with contacts 41' and 42' by interaction between insulator pad 38 and lower extremity 25' of set bar 25.

As the handle 23 is depressed to bring bread lift 15 into its lower or toasting position, support bar 14 is carried past detent 30, as shown in Fig. 4. This moves set bar 25 against the action of spring 27, thus forcing double contact blade 37 into the position shown in Fig. 5. In this position insulator block 40 has been moved by spring 48 within the outward extremity of contact blade 37, thus preventing it from springing back in the direction of its spring bias and holding it on contact 37' in engagement with contact 42'. This closes the circuit from line to the heating element through "start" bimetal assembly A.

Figure 6:
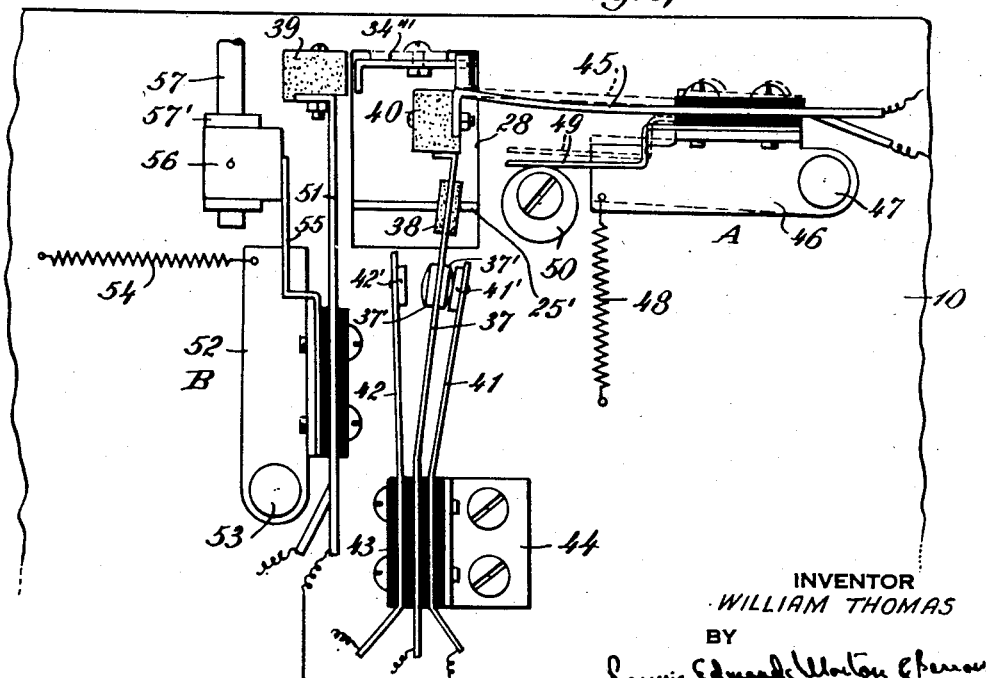
Fig. 6 is a view similar to Fig. 5 showing the thermal timer in an intermediate position.

Passage of current in this circuit causes bimetal arm 45 to heat. As a result of the ensuing warping of bimetal arm 45, insulator block 40 is moved out of engagement with the extremity of double contact blade 37, and, the spring bias of contact blade 37 carries it to the position shown in solid lines in Fig. 6. In this position, contact between contact 42' and one of the contacts 37' is broken and contact between contact 41' and the other contact 37' is established. In Fig. 6, the solid lines illustrate the position of the parts immediately after contact has been broken between contact 42' and a contact 37'. Bimetal arm 45 is still warped from heat generated by the passage of current; bimetal arm 51 has not yet begun to warp. The dotted lines show the position of "start" assembly A after it has cooled, but before blade 37 is moved again by lower end 25'.

Figure 7:
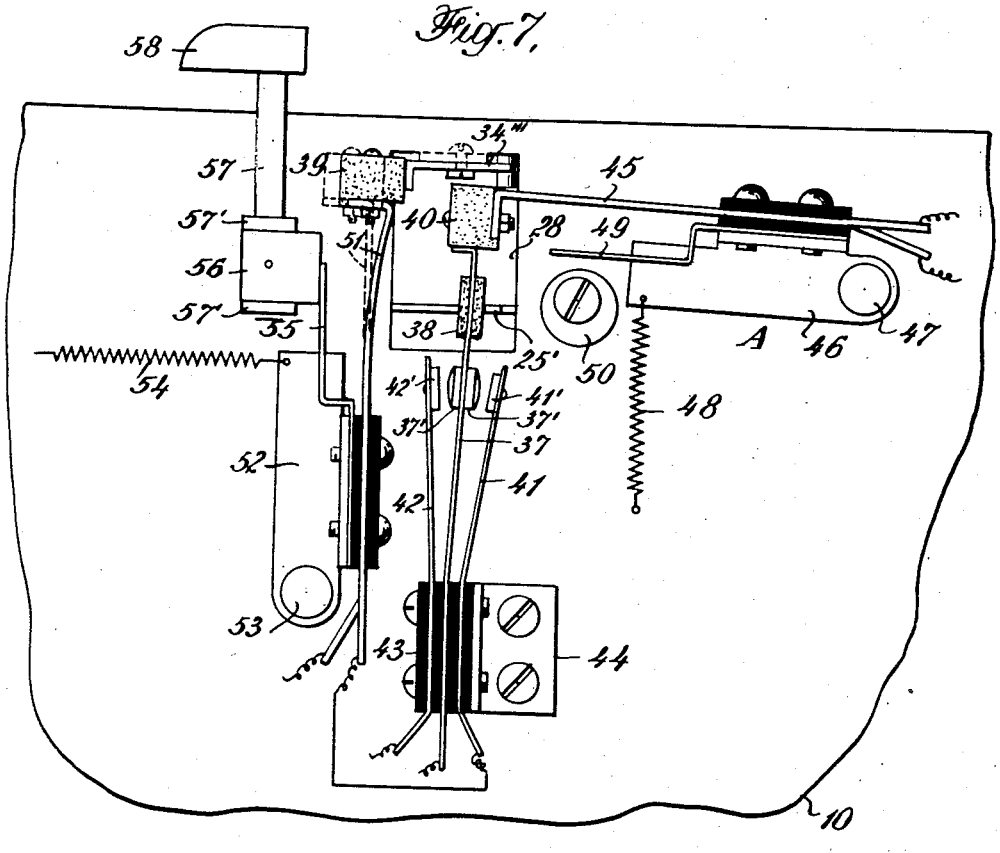
Fig. 7 is a view similar to Fig. 5 showing the thermal timer in the position it assumes immediately after tripping the bread lift latch.

A circuit is now closed from the line to the heating element through "trip" bimetal assembly B. Passage of current in this circuit causes bimetal arm 51 to heat. As a result of the ensuing warping of bimetal arm 51, insulator block 39 presses on trigger portion 34''' of latch 34 releasing pin and roller 17. When this occurs, the mechanism assumes the position shown in Fig. 7, in which lower extremity 25' of set bar 25 has again brought both contacts 37' out of contact with contacts 41' and 42'. In Fig. 7, the solid lines illustrate the position of the parts immediately after contact has been broken between contact 41' and a contact 37'. Bimetal arm 51 is still warped from heat generated by the passage of current. The dotted lines show the position of "trip" assembly B after it has cooled, but before a new cycle is started.

As is obvious, a longer period of time is required to achieve the desired degree of toasting when the toaster is completely cold than when a considerable quantity of residual heat remains from a prior toasting operation. This ambient heat will, of course, cause warping of bimetal arms 45 and 51, thus shortening the amount of additional warping of these arms to result from the passage of current that is necessary to accomplish the tripping of insulator blocks 40 and 39. The warping of arms 45 and 51 resulting from the ambient heat, however, causes an excessive shortening of the toasting time. It is to compensate for this that bimetals 45 and 51 are mounted on pivoted brackets 46 and 52, respectively, and provided with bimetal stop members 49 and 55. These bimetal stop members provide a rough compensation for the intensity of ambient heat. That is, the warping of bimetal stop members 49 and 55 against stops 50 and 56, respectively, under the influence of the ambient heat, serves to increase the amount of warping of bimetal arms 45 and 51 under the influence of the current necessary to accomplish the tripping action of insulator blocks 40 and 39, respectively, by an amount that only partially offsets the warping of these arms themselves under the influence of ambient heat.

The purpose of providing two bimetal assemblies, A and B, is to permit the toasting cycle to be infinitely repeated without intervening waiting periods for control bimetals to cool down to ambient temperature. The two-cycle thermal timer of my invention accomplishes this because after the current has been switched from assembly A to assembly B and before assembly B has tripped the bread lift, an adequate period has elapsed for bimetal arm 45 to have dissipated all heat from the previous passage of current. Equally, when a new cycle is begun without delay, after the tripping of the bread lift, the current remains cut off from bimetal 51 long enough before the warping of bimetal 45 can restore it for bimetal 51 to have cooled down to the ambient temperature. Eccentric stop 50 may be adjusted about screw 50' when the mechanism is first assembled to assure a proper distribution of the total current used between bimetal assemblies A and B regardless of manufacturing variations in them.

While I have described my invention in terms of the details of a particular embodiment thereof, it is not my intention to be limited to those details, but rather by the scope of the appended claims.

I claim:

1. A thermostatically-operated circuit maker-breaker for energizing an electrical load during a controlled period of time to be wired in series with the load including two input terminals, a single-pole, double-throw switch connected to one of said terminals, a first bimetal arm electrically connected between the other of said terminals and one throw of said switch, a second bimetal arm electrically connected between said other terminal and the other throw of said switch, mechanical means for holding the movable contactor of said switch in the both-throw open position outside the period of energization, mechanical means for moving said movable contactor to a first throw-closed position to connect in said first bimetal arm to initiate the timing cycle, resilient means urging said movable contactor from said first throw-closed position to a second throw-closed position to connect in said second bimetal arm, detent means carried by said first bimetal arm arranged to hold said movable contactor in said first throw-closed position when said first bimetal arm is relatively cold and to release said movable contactor when said first bimetal arm is heat-warped to a predetermined position, resilient means cocked at the initiation of said cycle for restoring said movable contactor to the both-throw open position, and trigger means actuated by said second bimetal arm when heat-warped to a predetermined position to release said cocked resilient means.

2. A circuit maker-breaker according to claim 1 including a pivoted bracket supporting at least one of the bimetal arms, spring means urging said bracket about its pivot, and a stop adjustably-positioned with respect to said pivot engaged by a stop element of said bracket under influence of said spring means and arranged to oppose the force exerted on said bracket by the heat-warping of its corresponding bimetal arm.

3. A circuit maker-breaker according to claim 2 in which the second bimetal arm is supported on the pivoted bracket and the adjustably-positioned stop is a rotatable cam surface, the rotation of which moves the position of the point of engagement between it and said bracket to and fro within predetermined limits in a direction to rotate said bracket on its pivot, and indexed handle means are provided for rotating said cam surface.

4. A circuit maker-breaker according to claim 3 in which the first bimetal arm is also supported on a pivoted bracket and, the adjustably-positioned stop engaged by the bracket supporting said first bimetal arm is provided with means for locking the adjustment thereof.

5. A circuit maker-breaker according to claim 1 including a pivoted bracket supporting at least one of the bimetal arms, an additional bimetal stop member carried by said bracket, spring means urging said bracket about its pivot, and a stop engaged by said bimetal stop member under the influence of said spring means and arranged to oppose the force exerted on the said bracket by the heat-warping of its corresponding bimetal arm, the heat-warping motion of said bimetal stop member being arranged to adjust the point of engagement between said bimetal stop member and said stop in a direction to locate the angular position of said bracket about its pivot to compensate for a change in position of said bimetal arm caused by heat-warping.

6. In a pop-up electric toaster of the type which includes an electric heater element, a bread carrier depressible from the up to the toasting position against a spring bias and latch means for retaining said bread carrier in toasting position until released, the improvement which includes, in series with said electric heater element as load, a circuit maker-breaker according to claim 1 so arranged that the mechanical means for holding the movable contactor in the both-throw open position is actuated by the return of said bread carrier to said up position, the mechanical means for moving said movable contactor to the first throw-closed position is actuated by the depression of said bread carrier to said toasting position, the resilient means cocked at the initiation of the cycle for restoring said movable contactor to said both-throw open position is cocked by the latching of said bread carrier in said toasting position, and the trigger means actuated by the second bimetal arm also operates to unlatch said bread carrier from said toasting position.

7. In a toaster according to claim 6, a pivoted setting bar depending downward from its pivot, a presser foot on the lower part of said bar arranged to make an electrically insulated contact with the movable contactor, spring means biasing said bar about its pivot away from said movable contactor, spring means biasing said movable contactor to the second throw-closed position and in a direction toward said presser foot, a cam on said bar adapted to be engaged by a cam follower on the bread carrier when in its upper position, a detent pivotally attached to said bar between said cam and said presser foot, a detent stop limiting the downward motion of said detent, a detent spring said detent against said detent stop, and a cam face on said detent adapted to be engaged by said cam follower in the motion of said bread carrier from the up to the toasting position, the foregoing elements being so proportioned and arranged that said cam causes said presser foot to hold said movable contactor in the both-throw open position when said bread carrier is in said up position, that said detent cam face causes said presser foot to move said movable contactor to the first throw-closed position as said bread carrier is depressed to said toasting position thereby engaging the detent means carried by the first bimetal arm, and that spring means causes said presser foot to clear a passage for movement of said movable contactor from said first throw-closed position to said second throw-closed position when said bread carrier is in the toasting position.

8. A circuit maker-breaker according to claim 1 including a separate pivoted bracket supporting each of the bimetal arms, a separate additional bimetal stop member carried by each of said brackets, spring means urging each of said brackets about its respective pivot, and stop means engaged by each of said bimetal stop members under the influence of said spring means and arranged to oppose the force exerted on the respective brackets by the heat-warping of their corresponding bimetal arms, the heat-warping motion of each of said bi-metal stop members being arranged to adjust the point of engagement between the corresponding bimetal stop member and the stop means in a direction to locate the angular position of that bracket about its respective pivot to compensate for a change in position of its corresponding bimetal arm caused by heat-warping.

WILLIAM THOMAS.

No references cited.

Certificate of Correction

Patent No. 2,560,261                                           July 10, 1951

WILLIAM THOMAS

It is hereby certified that error appears in the printed specification of the above numbered patent requiring correction as follows:

Column 8, line 42, strike out "No references cited." and insert instead the following:

*REFERENCES CITED*
*The following references are of record in the file of this patent:*

UNITED STATES PATENTS

| Number | Name | Date |
|---|---|---|
| 2,001,362 | Ireland | May 14, 1935 |
| 2,076,774 | Graham | Apr. 13, 1937 |
| 2,197,221 | Koci | Apr. 16, 1940 |
| 2,262,279 | Gomersall et al. | Nov. 11, 1941 |
| 2,282,089 | Propernick | May 5, 1942 |
| 2,303,561 | Koci | Dec. 1, 1942 |
| 2,367,500 | Huck | Jan. 16, 1945 |
| 2,389,927 | Parr | Nov. 27, 1945 | and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*